March 22, 1949.  B. B. WESTMORELAND ET AL  2,465,302
FOLDABLE CANOPY FRAME
Filed March 7, 1946  2 Sheets-Sheet 1
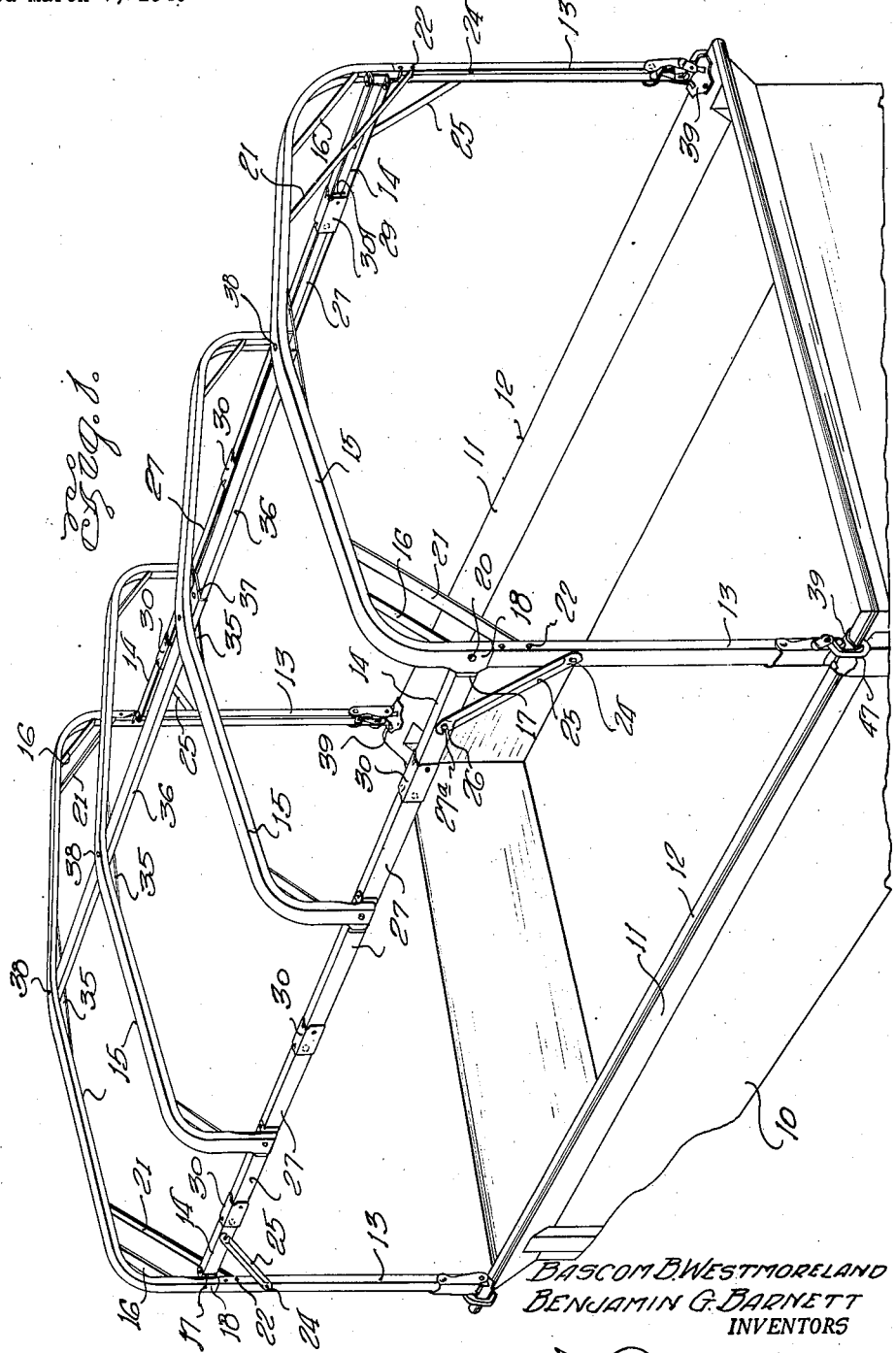
BASCOM B. WESTMORELAND
BENJAMIN G. BARNETT
INVENTORS March 22, 1949.   B. B. WESTMORELAND ET AL   2,465,302
FOLDABLE CANOPY FRAME
Filed March 7, 1946   2 Sheets-Sheet 2
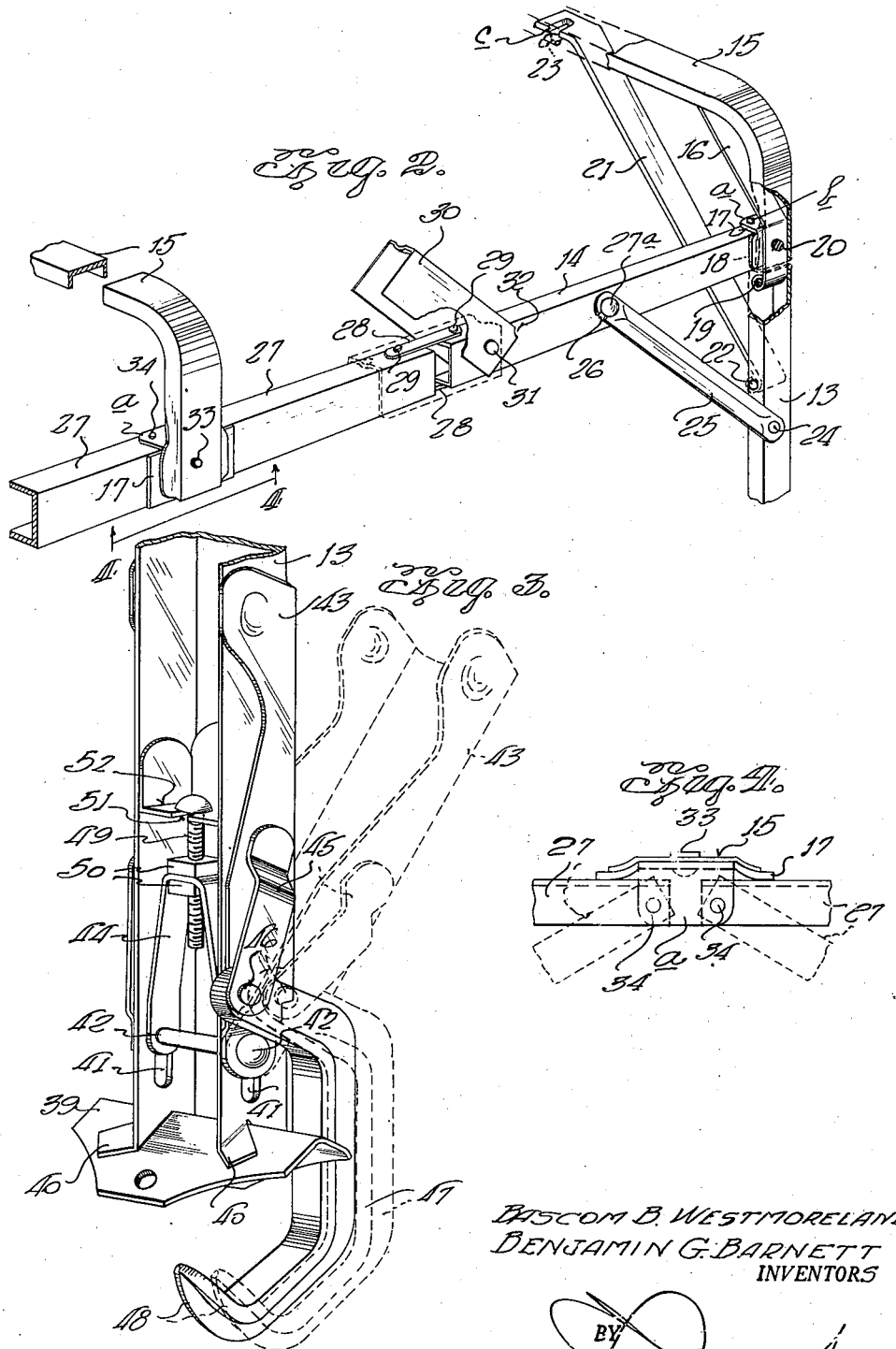
BASCOM B. WESTMORELAND
BENJAMIN G. BARNETT
INVENTORS
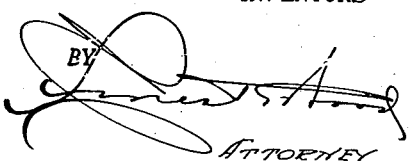
ATTORNEY Patented Mar. 22, 1949

2,465,302

UNITED STATES PATENT OFFICE 2,465,302

FOLDABLE CANOPY FRAME

Bascom B. Westmoreland and Benjamin G. Barnett, Dallas, Tex.

Application March 7, 1946, Serial No. 652,622

6 Claims. (Cl. 296—105)

This invention relates to collapsible frames for canopies and more particularly to such frames for supporting fabric covering for trucks.

The principal object of the invention is to provide a collapsible canopy frame consisting of at least four uprights or supporting legs, to which are attached side rails in axially aligned and foldable sections which carry parallel and relatively spaced bows and, by virtue of the inward folding action of the side rails, it is possible to collapse the entire structure into a comparatively compact space at the cab end of a truck body. Moreover, since the legs are likewise foldable into close relationship with the companion folded elements of the assembly, the dimensions of the resultant body are such that it will occupy but little space in shipping and storing.

Another object of the invention is to provide a collapsible canopy frame whose pivotally related side sections are, when extended, held in rigid relationship by means of a novel form of latch, yet this element and other reinforcing and stabilizing devices for the frame, may be changed from operative and inoperative positions without removing them, as separate elements, from the frame. An added feature of the assembly lies in the fact that the axially aligned sections of the side rails are connected together by overlying and underlying parallel links normally embraced by the latch in extended position but when folded the sections may lie in parallelism to contribute further to the compactness of the collapsed frame.

Still another object of the invention is to provide toggle clamps attached to the supporting legs of the frame which are lever actuated to engage and firmly embrace the rolled outer edge of the flare boards of a truck bed, provision being made for adjustment of the clamps to conform to supports of different sizes.

With the foregoing objects as paramount, the invention has further reference to certain features of accomplishment which will become apparent as the description proceeds, taken in connection with the accompanying drawing wherein:

Figure 1 is a perspective view of a collapsible canopy frame constructed according to the invention as mounted on a truck body, fragmentarily shown.

Figure 2 is a fragmentary view of one of the sectional side rails, including an end and an intermediate bow, showing the latch for holding the sections in extended position.

Figure 3 is a detail view in perspective of one of the leg clamps showing the latter and its operating lever displaced in dotted lines, and Figure 4 is a bottom plan view of the pivoted junction between certain of the side rail sections to which an intermediate bow is attached, the figure being taken on line 4—4 on Figure 2.

Continuing with a more detailed description of the drawing, reference is primarily made to Figure 1 wherein numeral 10 denotes a truck body of the "pick-up" type, shown fragmentarily and on which is mounted the conventional flare boards 11 whose top edges are rolled as at 12. It is to be understood that inasmuch as the primary purpose of the collapsible frame is to provide a cover for truck bodies, the device is shown as being so used. However, it will become apparent as the description proceeds that the frame may find other uses such as a cover for building materials; providing shelter against weather for campers, etc. Little variation in the structure shown will be required to adapt the frame for these and other uses.

The frame consists of four uprights or supports 13 of channel iron which, while not shown, are preferably reduced in width towards their upper ends. By referring to Figure 2, it will be observed that a typical corner assembly consists of a leg 13, a section 14 of a side rail, an end of a bow 15 and an angular brace 16. The lower end of the brace 16 lies between a substantially U-shaped stabilizing plate 17 and the flattened end 18 of the bow 15 and its extremity is rolled to embrace a pin 19 which is passed through aligned apertures in the upper end of the corner leg 13. A rivet 20 serves the combined function of securing the end 18 of the bow and the plate 17 together, as shown.

The plate 17, being of substantially U-shape, has parallel flanges a which embrace the end of the section 14 of a side rail. A pin b is passed through the flanges a of the plate and the end of said section 14 so that the latter may be folded inwardly to a position parallel with the bow 15. At the same time, the leg 13 may be folded upwardly to a position substantially parallel with the inwardly folded section 14. When the latter section is extended, however, the plate 17 being of a length greater than the width of the flattened end of the bow, its inner end extends inwardly of the bow and lies against the outer face of the section 14, serving to constrain the same against outward springing action, in short, reinforcing the same. The outer end of plate 17 is bent at right angles to lie against the outer end of rail section 14, although not shown.

Further reinforcing of the corners of the frame is effected by means of a strap 21 disposed below and parallel with the stationary brace 16 and whose lower end is pivotally connected by means of a pin 22, extending through the flanges of the leg 13. The upper end of the strap is slotted at c to receive a wing nut 23, threaded onto a bolt welded to the inner surface of the web of the bow 15. When the wing nut is loosened, the end of the strap 21 may be detached and the latter dropped downwardly between the flanges of the leg 13 in which concealed position it will be out of the way when the frame is to be folded.

Pivoted also to a leg 13 at 24 is a brace 25 which extends upwardly at an angle and a slot 26 at its opposite end engages over a headed pin 27a, extending outwardly from the side of the rail section 14. Thus each corner, identically constructed, is adequately reinforced yet it is obvious that all of the movable parts may be quickly and conveniently released and replaced in folding and unfolding the frame.

Referring now to the side rails; it is pointed out that each end section of each rail is indicated by numeral 14. Each of the two side rails is made up of six, axially alignable sections including the end sections 14 and intermediate sections 27. As further shown in Figure 2, the rail section 27 next adjacent an end section 14 is joined to such end section by means of parallel links 28, one lying below and one above the said sections, their ends being pivoted to the respective sections by means of pins 29. By slightly spacing the confronting ends of the sections apart, made possible by the links 28, the end section may be folded inwardly, followed by the adjacent section 27 so that the outer face of the latter will lie flush against the outer face of section 14.

When the sections 14 and 27 are extended, as shown, a latch 30 is arranged to overlie and bridge the space between the ends thereof, holding the links 28 against lateral displacement to prevent relative movement of the ends of the sections. This latch consists of a plate formed into substantially U-shape to straddle the ends of the sections 27 and 14. A pin 31 pivotally secures the latch to one end of section 14 and a recess 32 (Fig. 2) is made in the top of the latch at its pivoted end so that it may be raised to the solid line position shown in Figure 2 to release the rail sections 14 and 27 for folding.

The manner in which the intermediate bows 15 are connected to the side rail sections 27 is shown also in Figure 2 and in Figure 4. The flanges of the bows are spread out or flattened as shown and in a manner similar to the shaping of the end bows, as described previously. A stabilizing plate 17, given the same reference numeral as the plate earlier described because of its identical function is affixed to the flattened end of bow 15 by a rivet 33. The flanges a overlie and underlie the confronting ends of the juxtapositioned rail sections 27 and pins 34 pivotally connect the ends of the rails to the flanges a so that as the end of rail section 14 is swung inwardly, as described, the other sections will follow suit, forming a zig-zag pattern as the bows 15 move closer together and until all of the bows as well as all of the rail sections assume a position parallel to each other.

Inasmuch as the remaining structure is identical to that described, the foregoing is considered adequate to explain the construction, relationship and function of the parts making up the side rails, bows and reinforcing elements. However, it is pointed out that each bow 15 has a strap 35 spanning the bend in its apex, and a ridge rail 36, made in axially aligned sections is slid into a position between these straps and the bow. The sections of the ridge rail are joined together by a screw 37 (Fig. 1) while screws 38 hold the ridge rail against longitudinal displacement. The object in making this rail in detachable sections is to reduce its length to that of the bows 15 which represents the approximate length of a shipping carton adapted to contain the frame.

Referring now to the toggle clamp by which the frame is mounted on a truck bed, attention is directed to Figure 3 wherein numeral 39 denotes a saddle adapted to rest on the roll 12 of the truck bed 10, as shown. The lower end of a leg 13 is split to define extensions 40, bent to lie flush on the top of the saddle where they are riveted or welded. The flanges of the channeled leg 13 are provided with parallel slots 41 and slidable in these slots is a pin 42 which joins the lower ends of a lever 43 and an inverted V-shaped adjusting frame 44 together. The lever 43 is channel shaped to conform to the leg 13, as shown in solid lines in Figure 3 and is displaceable to the position shown in dotted lines in this figure by virtue of its pivotal connection with pin 42 and the fact that this pin is slidable in the slots 41.

Affixed by welding or otherwise to each side of lever 43 is a bracket 45, whose major axis is in offset relation to that of the lever 43 and to the lower end of this bracket is pivoted at 46 a substantially hooked shaped member 47 which depends to a point well below the saddle 39 so that its lower, upwardly curved end 48 will underlie the roll 12 of a truck bed 10.

The adjusting frame 44 previously referred to is disposed between the flanges of the leg 13 and, as stated, is pivotally joined to the lever 43 by means of the pin 42. This frame is stationary except when vertically adjusted by means of a threaded pin 49, passing downwardly through an aperture in the head of the frame 44 and secured against rotative displacement by means of lock nuts 50. The neck of this threaded pin lies in a slot 51 in a cross member 52, disposed transversely between the flanges of the leg 13 and by raising and lowering the frame 44 by adjusting the pin 49, the lever 43 and consequently the hook 47 are similarly adjusted.

It is apparent from the foregoing that by adjusting the screw or threaded pin 44, the spacing between the hook 48 and 39 is varied to correspond to any variations in size of a roll 12 or any other support to which the toggle clamp is attached. By raising the lever 43 from the dotted position to the solid line position shown, the member 47 is caused to move upwardly, bringing the hook 48 against the underside of the roll 12 of the flare boards 11 of the truck body 10, thereby securely clamping the leg in position thereon. Obviously, each of the legs 13 are similarly clamped to the truck body to secure the collapsible frame in position.

When it is desired to collapse the frame without removing the same from the truck, only the rear end clamps are released by lowering the levers 43. The rear portion of the frame is then thrust forwardly, folding the side rails, as described previously and afterwards resecuring the rear clamps to the truck in close relationship to the forward clamps. Of course, when the frame is collapsed, the ridge rail 36 is removed.

Manifestly, the construction as shown and described is capable of some modification and such modification as may be construed to fall within the scope and meaning of the appended claims is also considered to be within the spirit and intent of the invention.

What is claimed is:

1. A collapsible canopy frame for trucks including spaced apart uprights, side rails composed of a plurality of relatively hinged, axially alignable sections, foldable inwardly, one against the other to lie collectively in a horizontal plane, a plurality of spaced bows whose ends are connected to respective side rails at alternate hinged points between the sections thereof, means for hingedly connecting the upper ends of said uprights to the ends of the outer of said bows whereby said legs will be foldable into longitudinal parallel relationship with said bows and a pivotally displaceable, substantially U-shaped latch bridging the joint between certain of said side rail sections in extended positions to hold said sections against lateral displacement.

2. A foldable canopy frame for trucks including uprights, a plurality of side rails in axially alignable sections supported by said uprights, means hinging said sections together for inward folding displacement to lie parallel in a horizontal plane, bows spaced apart having their ends pivotally connected to alternate hinged joints between said sections and movable into parallel juxtaposition upon folding of said sections, means hingedly connecting said uprights to the ends of the outer of said bows and a pivotally displaceable and substantially U-shaped latch means embracing certain of the joints between said rail sections to hold the same in extended position.

3. In a foldable canopy frame for trucks, a pair of side rails, each composed of a plurality of relatively hinged sections, axially aligned in extended position, substantially U-shaped pivoted means bridging the hinged joints between said sections to hold the same extended, said sections being foldable in horizontal juxtaposition, a plurality of bows whose ends are connected to alternate hinged joints of said rail sections and movable into contiguous parallelism when said rail sections are folded, uprights supporting said side rails and bows and means hingedly connecting the upper ends of said uprights to the ends of the outer of said bows for foldability into parallel juxtaposition therewith.

4. In a foldable canopy frame, a pair of side rails composed of a plurality of axially alignable sections hinged in end to end relationship for inward foldability into parallel juxtaposition in a horizontal plane, bows supported at alternate hinged joints of said sections and adapted, upon folding said sections, to lie in parallel juxtaposition thereto, pivoted means for latching said rail sections in extended relationship, uprights supporting said rails and bows and means for hingedly connecting said uprights to the ends of the outer of said bows whereby said uprights will be foldable into parallelism with said rail sections and said bows.

5. The structure set forth in claim 4, further defined in that the rail section locking means consists of a substantially U-shaped shell pivoted at one end to an end of a rail section and adapted to embrace the upper portion of said rail section and its companion at their adjacent ends to overlap the space therebetween.

6. The structure set forth in claim 4, further defined in that the hinged joint between certain of the rail sections is composed of a substantially U-shaped plate, the parallel flanges of which overlie and underlie the adjacent ends of said rail sections to receive pins on which said sections hinge and which hold the adjacent ends of said sections in spaced relationship and for foldability of said sections into parallelism.

BASCOM B. WESTMORELAND.
BENJAMIN G. BARNETT.

REFERENCES CITED

The following references are of record in the file of this patent:

UNITED STATES PATENTS

| Number | Name | Date |
| --- | --- | --- |
| 26,547 | Dikeman | Dec. 20, 1859 |
| 760,928 | Shipley | May 24, 1904 |
| 1,204,329 | Wilkins | Nov. 7, 1916 |
| 1,413,474 | Gorrell et al. | Apr. 18, 1922 |
| 2,151,908 | Gottlieb | Mar. 28, 1939 |